(12) United States Patent
Nomoto et al.

(10) Patent No.: US 11,080,557 B2
(45) Date of Patent: Aug. 3, 2021

(54) IMAGE AUTHENTICATION APPARATUS, METHOD, AND STORAGE MEDIUM USING REGISTERED IMAGE

(71) Applicant: CANON KABUSHIKI KAISHA, Tokyo (JP)

(72) Inventors: Atsuo Nomoto, Tokyo (JP); Hiroshi Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 16/376,010

(22) Filed: Apr. 5, 2019

(65) Prior Publication Data
US 2019/0311225 A1    Oct. 10, 2019

(30) Foreign Application Priority Data

Apr. 10, 2018   (JP) ............................. JP2018-075350

(51) Int. Cl.
*G06K 9/62*     (2006.01)
*G06K 9/00*     (2006.01)

(52) U.S. Cl.
CPC ....... *G06K 9/6255* (2013.01); *G06K 9/00288* (2013.01); *G06K 9/6215* (2013.01); *G06K 9/00362* (2013.01)

(58) Field of Classification Search
CPC ... H04L 2209/56; H04L 9/0816; G06F 21/30; G06F 21/31; G06F 21/445
See application file for complete search history.

(56) References Cited

U.S. PATENT DOCUMENTS 6,418,282 B1 *  7/2002  Ayash ...................... B41J 2/175
                                                399/107
6,560,065 B1 *  5/2003  Yang .................... G11B 33/148
                                                360/97.15

(Continued)

FOREIGN PATENT DOCUMENTS

JP      2009-211177 A     9/2009
JP         4343125 B2    10/2009

OTHER PUBLICATIONS

Hieu V. Nguyen et al.; "Cosine Similarity Metric Learning for Face Verification;" School of Computer Science, University of Nottingham, Jubilee Campus, Wollaton Road, Nottingham, NG8 1BB, UK; http://www.nottingham.ac.uk/cs/; pp. 1-13.

(Continued)

*Primary Examiner* — Yosef Kassa
(74) *Attorney, Agent, or Firm* — Canon U.S.A., Inc. IP Division

(57) ABSTRACT

An image authentication apparatus includes a registration unit, a parameter computing unit, a similarity degree calculation unit, a status acquisition unit, and a generation unit. The registration unit is configured to register an image of an object to be authenticated in a registration dictionary as a registered image. The parameter computing unit is configured to compute a parameter based on the registered image. The parameter is computed for a degree of similarity between an image of the object and the registered image. The similarity degree calculation unit is configured to calculate a degree of similarity between an image of the object and the registered image, using the parameter. The status acquisition unit is configured to acquire a registration status of the registered image. The generation unit is configured to generate a display screen including the registration status, and to output the generated display screen.

19 Claims, 17 Drawing Sheets

(56) References Cited

U.S. PATENT DOCUMENTS

| | | | | |
|---|---|---|---|---|
| 7,158,657 | B2 * | 1/2007 | Okazaki | G06K 9/00221 |
| | | | | 382/118 |
| 7,519,828 | B2 * | 4/2009 | Kittler | G06K 9/00288 |
| | | | | 713/186 |
| 8,014,571 | B2 * | 9/2011 | Friedman | H04N 7/18 |
| | | | | 382/117 |
| 8,059,858 | B2 * | 11/2011 | Brundage | G06Q 20/347 |
| | | | | 382/100 |
| 8,085,996 | B2 * | 12/2011 | Ogawa | G06K 9/00308 |
| | | | | 382/118 |
| 8,139,825 | B2 * | 3/2012 | Abe | G06K 9/6206 |
| | | | | 382/115 |
| 8,184,867 | B2 * | 5/2012 | Otto | G06K 9/00617 |
| | | | | 382/117 |
| 8,264,327 | B2 * | 9/2012 | Fujita | G06K 9/00288 |
| | | | | 340/5.83 |
| 8,462,226 | B2 * | 6/2013 | Kameyama | G06K 9/42 |
| | | | | 348/222.1 |
| 8,503,735 | B2 * | 8/2013 | Morita | G06F 16/5854 |
| | | | | 382/115 |
| 9,020,265 | B2 * | 4/2015 | Wu | G06K 9/3258 |
| | | | | 382/182 |
| 9,087,238 | B2 * | 7/2015 | Choi | G06K 9/00604 |
| 9,098,760 | B2 * | 8/2015 | Saito | G06K 9/036 |
| 9,141,184 | B2 * | 9/2015 | Uchikoshi | G06K 9/036 |
| 9,325,707 | B2 * | 4/2016 | Ketchantang | G06K 9/6202 |

OTHER PUBLICATIONS

Paul Viola et al.; "Robust Real-Time Face Detection;" Eighth International Conference on Computer Vision (ICCV' 01)—vol. 2; International Journal of Computer Vision 57(2), pp. 137-154, 2004.

* cited by examiner

FIG.15

REGISTRATION STATUS

| No | PERSON ID | REGISTERED IMAGE | | |
|---|---|---|---|---|
| | | MORNING (25/30) | AFTERNOON (20/30) | NIGHT (1/30) |
| 1 | 0001 | 😐 | 😐 | × |
| 2 | 0002 | 😐 | | 😐 |
| 3 | 0003 | 😐 | × | × |

IMAGE AUTHENTICATION APPARATUS, METHOD, AND STORAGE MEDIUM USING REGISTERED IMAGE

BACKGROUND

Field of the Invention

One disclosed aspect of the embodiments relates to an image authentication technology for authenticating an object; in particular, a specific human figure from a video image input from an apparatus such as a camera.

Description of the Related Art

There is known a human figure authentication technology for capturing an image with an image capturing apparatus such as a camera, and determining who is a human figure appearing in the image. The human figure authentication technology is applied to, for example, a criminal investigation using a face photograph and a search for a lost child. Cameras for capturing images usually vary in installation location and viewing angle. Therefore, the cameras vary in imaging conditions in imaging of a human figure that are, for example, a direction of a human figure and an illumination condition. For this reason, a human figure authentication technology that enables accurate recognition even if imaging conditions vary is desired.

The human figure authentication technology evaluates variations in calculated degree of similarity between an image obtained by imaging a human figure and an image of a human figure registered beforehand (hereinafter referred to as "registered image"), and thereby determines whether the imaged human figure matches any one of the registered human figures.

H. V. Nguyen and L. Bai, Cosine similarity metric learning for face verification, in ACCV, 2011 discusses a technology for learning a parameter for similarity degree calculation beforehand based on mass data, and calculating a similarity degree based on the learned parameter. Because the parameter is learned beforehand through use of the mass data including various imaging conditions, accurate recognition can be performed even if imaging conditions vary.

Japanese Patent No. 4343125 discusses a technology for computing a transformation matrix for transforming a feature amount obtained from an image so that human figures included in a registered image are easily distinguished from each other, and calculating a similarity degree in a transformed feature space. Because the transformation matrix is thus computed based on the registered image, human figure authentication suitable for distinguishing a human figure within a registered image can be performed and therefore, authentication accuracy improves.

However, in each of the technologies described above, it is difficult to obtain a similarity degree calculation parameter suitable for an installation location of a camera serving as an image capturing apparatus. In the technology discussed in the paper of Nguyen et al., an installation location of a camera is not found beforehand, and therefore, a technology for computing a similarity degree calculation parameter suitable for an installation location beforehand is not discussed. In the technology discussed in Japanese Patent No. 4343125, it is possible to compute a similarity degree calculation parameter suitable for distinguishing the human figure included in the registered image. However, a technology for computing a similarity degree calculation parameter suitable for an installation location of a camera is not discussed.

In addition, in each of the technologies described above, a plurality of registered images captured under a plurality of conditions can be used. In this case, there is such an issue that a user cannot recognize beforehand what kind of image needs to be prepared as a registered image. Specifically, there is such an issue that, in a case where the user registers his/her own image for each of a plurality of conditions, the user cannot recognize beforehand for which condition an image is registered and for which condition no image is registered.

In general, authentication accuracy is high in a case where imaging conditions of registered images and imaging conditions of an image capturing apparatus installed at an authentication location are close. However, because imaging conditions, e.g., a light amount and a light source position, change in time and date for image capturing, depending on the authentication location, it is desirable to prepare registered images corresponding to various conditions to the extent possible. To realize this, a user needs to remember beforehand for which condition an image is already registered, which decreases the convenience of the user.

SUMMARY

According to an aspect of the embodiments, an image authentication apparatus includes an image acquisition unit, a registration unit, a parameter computing unit, a similarity degree calculation unit, a status acquisition unit, and a generation unit. The image acquisition unit is configured to acquire an image of an object to be authenticated from an image capturing apparatus. The registration unit is configured to register an image of the object in a registration dictionary as a registered image. The parameter computing unit is configured to compute a parameter based on the registered image. The parameter is computed for calculation of a degree of similarity between an image of the object and the registered image registered in the registration dictionary. The similarity degree calculation unit is configured to calculate a degree of similarity between an image of the object and the registered image through use of the parameter. The status acquisition unit is configured to acquire a registration status of the registered image in the registration dictionary. The generation unit is configured to generate a display screen including the registration status, upon receipt of a registration request for registering the image of the object in the registration dictionary, and to output the generated display screen to a display apparatus.

Further features of the disclosure will become apparent from the following description of exemplary embodiments with reference to the attached drawings.

BRIEF DESCRIPTION OF THE DRAWINGS

FIG. 15 is a diagram illustrating a screen for confirmation of a registration status.

DESCRIPTION OF THE EMBODIMENTS

A first exemplary embodiment will be described in detail below with reference to the drawings. In the following description, a similarity degree calculation parameter is computed for each installed camera, and authentication is performed based on a captured image to determine whether a human figure to be authenticated is a human figure registered in a registration dictionary. Further, as a use case of authentication of a human figure, an example of control for entrance and exit of a gate will be described.

Figure 1:
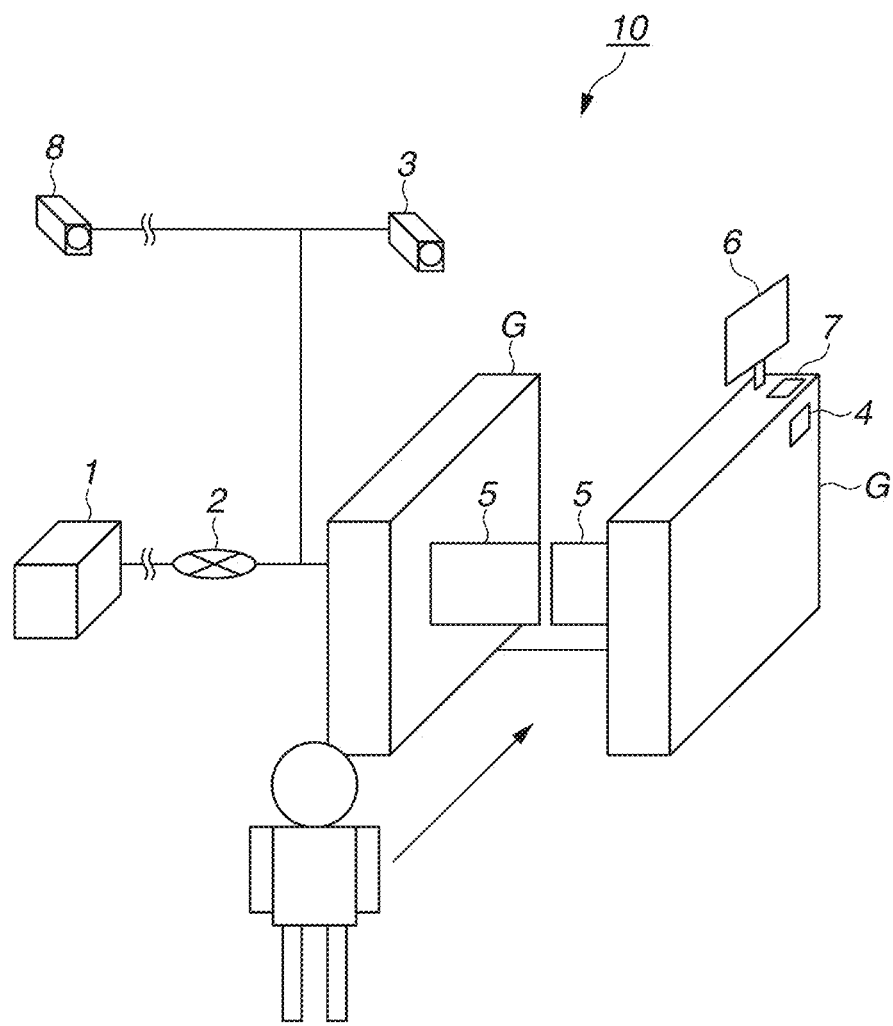
FIG. 1 is a diagram illustrating a schematic configuration of an image authentication system.

FIG. 1 is a diagram illustrating a schematic configuration of an image authentication system 10. In FIG. 1, a human figure to be authenticated, a gate G, and the other apparatuses are arranged. FIG. 1 illustrates a state where the human figure to be authenticated moves toward the gate G.

Specifically, the image authentication system 10 includes an image authentication apparatus 1, a network 2, an image capturing apparatus 3, a control apparatus 4 built in the gate G, flappers 5 provided at the gate G to control entrance of a human figure, a display apparatus 6, an input apparatus 7, and an image capturing apparatus 8. The image authentication apparatus 1, the image capturing apparatus 3, and the image capturing apparatus 8 are connected to the control apparatus 4 via the network 2.

The image authentication apparatus 1 receives a captured image by communicating with each of the image capturing apparatus 3 and the image capturing apparatus 8 via the network 2, and identifies a human figure within the image by performing processing such as image authentication processing. Further, the image authentication apparatus 1 performs authentication processing for the identified human figure. Furthermore, the image authentication apparatus 1 performs authentication processing for determining whether to permit entrance of the human figure, and outputs an authentication result obtained by the authentication processing to each of the apparatuses. The network 2 is used for communication between the apparatuses. In the first exemplary embodiment, a local area network is used as the network 2, but other communication network may be used.

In the first exemplary embodiment, a network camera including an optical lens, an image sensor, and a communication unit is used as the image capturing apparatus 3. The network camera includes a camera unit and a communication device for connection to a network. The camera unit includes a lens and an image capturing element represented by a charge-coupled device (CCD) sensor and a complementary metal oxide semiconductor (CMOS) sensor. In place of such a network camera, another type of camera having a communication function may be used. The camera unit is not limited to a camera using light including visible light, and another type of unit such as an infrared camera unit may be used. An image captured by the image capturing apparatus 3 is output to the image authentication apparatus 1 via the network 2.

The control apparatus 4 receives an authentication result from the image authentication apparatus 1, and outputs a control signal to the flappers 5 to control opening and closing of the flappers 5. Further, the control apparatus 4 outputs information such as a video image for display acquired from the image authentication apparatus 1 to the display apparatus 6. The flappers 5 are opened and closed based on control information acquired from the control apparatus 4. The display apparatus 6 is a display that displays information and images acquired from the image authentication apparatus 1. The input apparatus 7 is an input apparatus such as a keyboard, a mouse or a touch panel. The input apparatus 7 receives an input from a user and outputs the received input to the image authentication apparatus 1. Alternatively, a touch panel-type display may be provided as the display apparatus 6 so that the display apparatus 6 also serves the input apparatus 7.

The image capturing apparatus 8 is disposed at a gate provided at a location different from the location of the gate G illustrated in FIG. 1. The image capturing apparatus 8 has a configuration and a function similar to the configuration and the function of the image capturing apparatus 3. Therefore, the image capturing apparatus 8 also outputs a captured image to the image authentication apparatus 1 via the network 2. The above-described gate provided at the different location is also connected to the image authentication apparatus 1 via the network 2. The number of the image capturing apparatuses is not limited to the example illustrated in FIG. 1 and may be any number.

In the first exemplary embodiment, the apparatuses are configured as separate apparatuses, but one apparatus may have the functions of the plurality of apparatuses described above. For example, together with the control apparatus 4, the image authentication apparatus 1 may be built in the gate G.

Hardware Configuration

Figure 2:
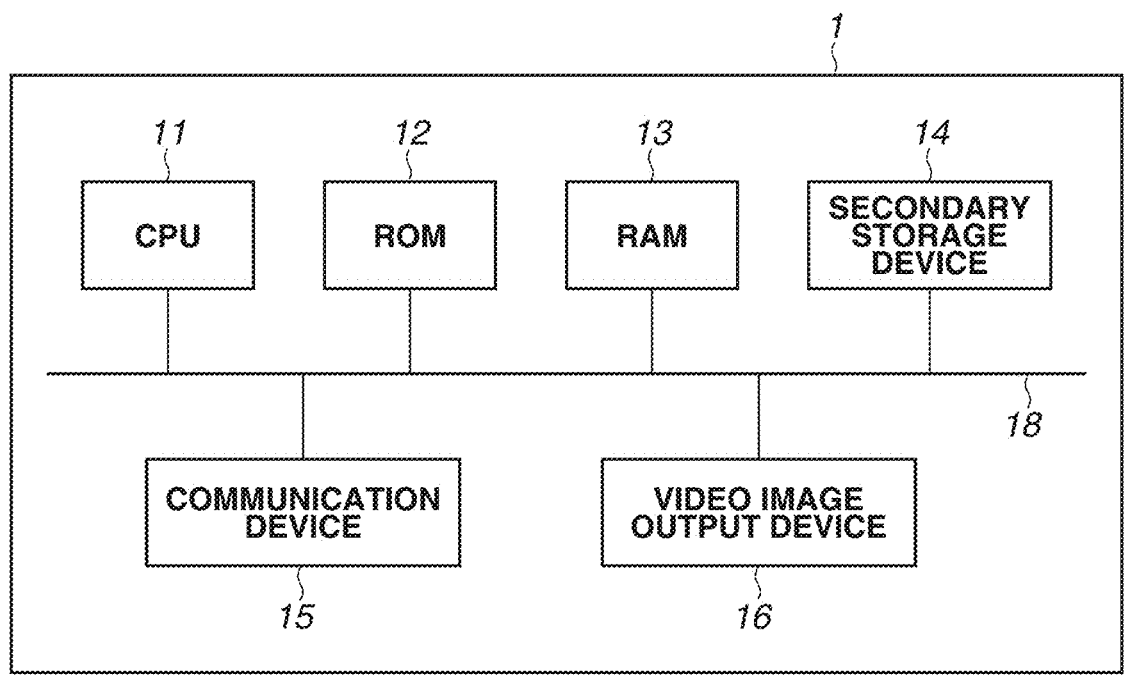
FIG. 2 is a hardware block diagram illustrating an image authentication apparatus.

FIG. 2 illustrates a hardware block diagram of the image authentication apparatus 1. As illustrated in FIG. 2, the image authentication apparatus 1 includes a central processing unit (CPU) 11, a read only memory (ROM) 12, and a random access memory (RAM) 13. The image authentication apparatus 1 further includes a secondary storage device 14, a communication device 15, a video image output device 16, and a connection bus 18.

The CPU 11 controls the entire image authentication apparatus 1 by loading a control program or a set of instructions stored in each of the ROM 12 and the secondary storage device 14 into the RAM 13, and executing the loaded control program. The ROM 12 is a nonvolatile memory and stores the control program and various parameter data. The control program is executed by the CPU 11 as described above, so that processing to be described below is implemented. The operations to be performed by the CPU 11 include at least the operations described in the following and the flowcharts. The RAM 13 is a volatile memory, and temporarily stores images and the control program as well as execution results of the control program. The secondary storage device 14 is a rewritable secondary storage device such as a hard disk or a flash memory, and stores images received from the image capturing apparatuses 3 and 8 via the communication device 15. The secondary storage device 14 also stores the control program, and information such as various setting contents and processing results. These pieces of information are output to the RAM 13, and used by the CPU 11 for the execution of the program.

The communication device 15 is a wire communication unit, and performs communication with various devices via the network 2. The communication device 15 may be a wireless communication unit. The video image output device 16 generates a video image based on an image or an execution result of the control program that are acquired from the RAM 13, and outputs the generated video image to the display apparatus 6 via the communication device 15. The connection bus 18 connects the devices included in the image authentication apparatus 1 and thereby performs data communication between the devices.

In the first exemplary embodiment, the CPU 11 of the image authentication apparatus 1 executes a computer program for implementing processing to be described below so that the processing is implemented by software. However, part or all of the processing of the image authentication apparatus 1 may be implemented by hardware. A device such as a dedicated circuit (an application-specific integrated circuit (ASIC)) or a processor (such as a reconfigurable processor or a digital signal processor (DSP)) can be used as hardware.

Software describing the processing to be described below may be acquired via a network or a computer readable storage medium, and then executed by a processing device (a CPU or a processor) of an apparatus such as a personal computer.

Functional Configuration

Figure 3:
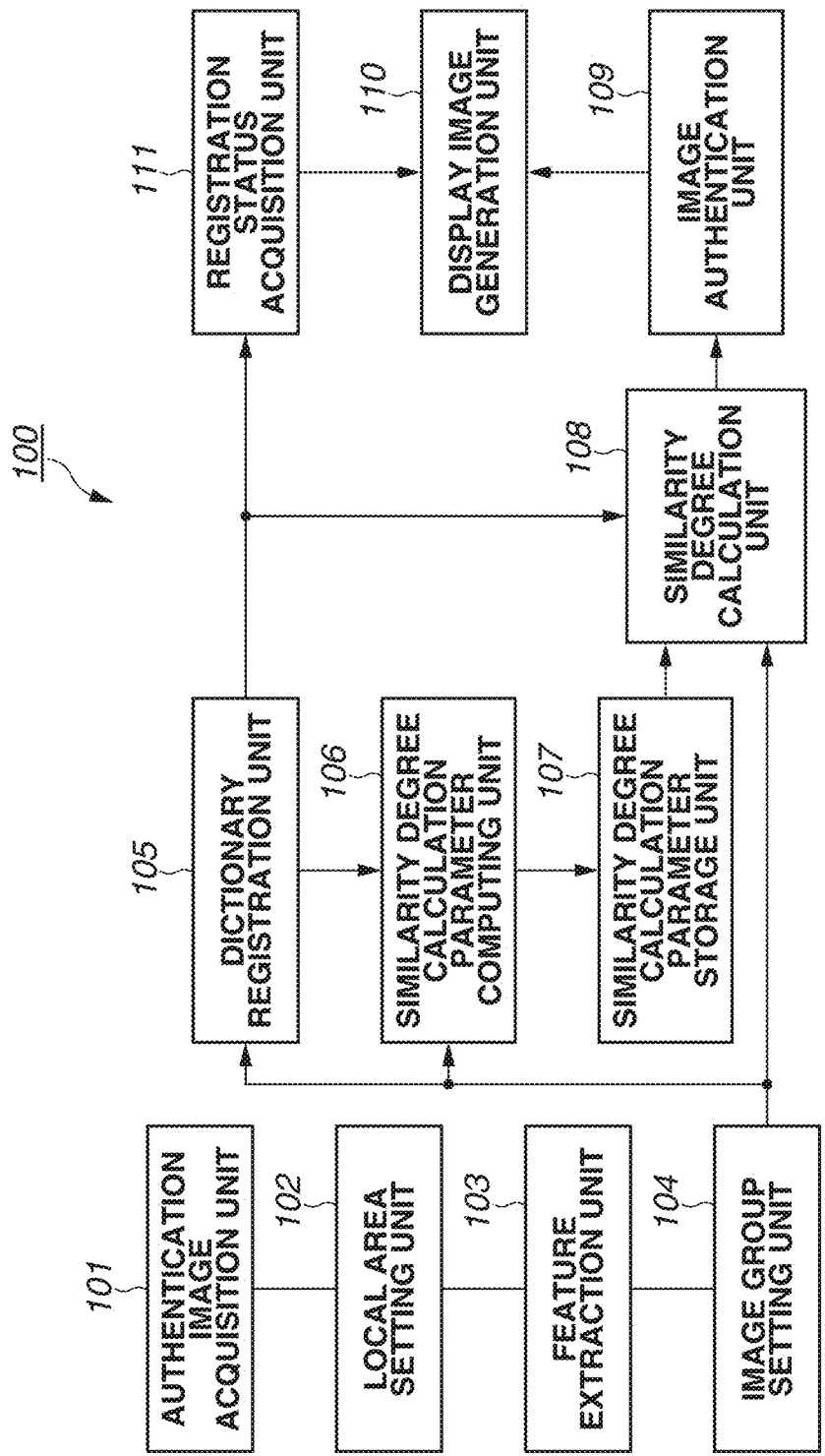
FIG. 3 is a diagram illustrating a functional configuration of an authentication unit.

FIG. 3 is a diagram illustrating a functional configuration of an authentication unit 100 formed by the control program to be executed by the CPU 11 of the image authentication apparatus 1. The authentication unit 100 includes an authentication image acquisition unit 101, a local area setting unit 102, a feature extraction unit 103, an image group setting unit 104, a dictionary registration unit 105, a similarity degree calculation parameter computing unit 106, a similarity degree calculation parameter storage unit 107, and a similarity degree calculation unit 108. The authentication unit 100 further includes an image authentication unit 109, a display image generation unit 110, and a registration status acquisition unit 111.

The authentication image acquisition unit 101 acquires an image captured by the image capturing apparatus 3 or the image capturing apparatus 8, acquires an authentication image based on the acquired captured image, and outputs the authentication image to the local area setting unit 102. The authentication image is an image in which an object to be authenticated appears. In the first exemplary embodiment, the authentication image is an image in which the face of a human figure appears. The local area setting unit 102 extracts a feature point such as the eye or nose of the face of the human figure and information indicating the coordinates of the feature point, from the authentication image acquired from the authentication image acquisition unit 101. The local area setting unit 102 sets a local area based on the extracted feature point. The local area setting unit 102 outputs the local area together with the authentication image to the feature extraction unit 103.

The feature extraction unit 103 extracts a feature amount based on the authentication image and the local area acquired from the local area setting unit 102, and outputs the extracted feature amount to the image group setting unit 104. In the first exemplary embodiment, the feature amount is extracted for each local area. The image group setting unit 104 classifies images into groups based on the feature amounts acquired from the feature extraction unit 103, determines which image belongs to which group, and sets the result of the determination. The set group is stored into the secondary storage device 14 in association with the feature amount, and is output to the similarity degree calculation unit 108, the dictionary registration unit 105, or the similarity degree calculation parameter computing unit 106.

The dictionary registration unit 105 stores a registration dictionary including the authentication image and the feature amount acquired from the image group setting unit 104, into the secondary storage device 14. The registration dictionary is data in which the authentication image, the feature amount, a person identification (ID) (such as the name of a person, in general) corresponding to the feature amount, and a thumbnail image for display are associated with one another. The method for acquiring the person ID will be described below. The registration dictionary may include data of a plurality of human figures, and may include a plurality of pieces of data for one human figure. Further, the registration dictionary is output to the similarity degree calculation parameter computing unit 106, the similarity degree calculation unit 108, or the registration status acquisition unit 111, in response to a request. The thumbnail image of the registration dictionary is also output to the display image generation unit 110 in response to a request. The registration status is information including the number of registered human figures and the number of pieces of data for a certain human figure. As will be described below, in another form, a plurality pieces of registered data may be classified into specific groups and a registration status may be calculated for each of the groups.

The similarity degree calculation parameter computing unit 106 computes a similarity degree calculation parameter, based on the feature amount acquired from the image group setting unit 104, or the feature amount of the registration dictionary acquired from the dictionary registration unit 105, and outputs the calculated similarity degree calculation parameter to the similarity degree calculation parameter storage unit 107. The similarity degree calculation parameter storage unit 107 stores the similarity degree calculation parameter acquired from the similarity degree calculation parameter computing unit 106 into the secondary storage device 14. The stored similarity degree calculation parameter is output to the similarity degree calculation unit 108, in response to a request.

The similarity degree calculation unit 108 calculates the degree of similarity between the feature amount determined from the feature point such as the eye or nose of the face of the human figure and acquired from the image group setting unit 104, and the registration dictionary acquired from the dictionary registration unit 105, based on the similarity degree calculation parameter acquired from the similarity degree calculation parameter storage unit 107. The calculated degree of similarity is output to the image authentication unit 109. Based on the degree of similarity acquired from the similarity degree calculation unit 108, the image authentication unit 109 performs image authentication, and outputs an authentication result of the image authentication to the display image generation unit 110. As described above, the authentication result represents to which ID in the registration dictionary the acquired human figure in the authentication image corresponds, or whether a corresponding person ID is present. The authentication result is output to the display image generation unit 110.

The display image generation unit 110 generates a display image, using the authentication result acquired from the image authentication unit 109, the dictionary acquired from the dictionary registration unit 105, and the registration status acquired from the registration status acquisition unit 111. The generated display image is transmitted to the display apparatus 6 via the communication device 15 and displayed by the display apparatus 6.

Overall Flow

Broadly speaking, similarity degree calculation parameter computing processing, authentication processing, and dictionary registration processing are performed in the first exemplary embodiment. In the similarity degree calculation parameter computing processing, a similarity degree calculation parameter corresponding to each of the image capturing apparatus 3 and the image capturing apparatus 8 that are installed is computed. In the authentication processing, authentication is performed to determine whether an image captured by each of the image capturing apparatus 3 and the image capturing apparatus 8 corresponds to a human figure registered beforehand, and the opening and closing of the gate G is controlled based on the result of the authentication. In the dictionary registration processing, processing for adding a human figure to be permitted to enter and exit to a registration dictionary is performed.

In the following description, the image capturing apparatus 3 and the image capturing apparatus 8 are already installed at the time when each processing starts, and the image authentication apparatus 1 is in a state where the image authentication apparatus 1 can immediately acquire an image to start processing to be described below.

Figure 4:
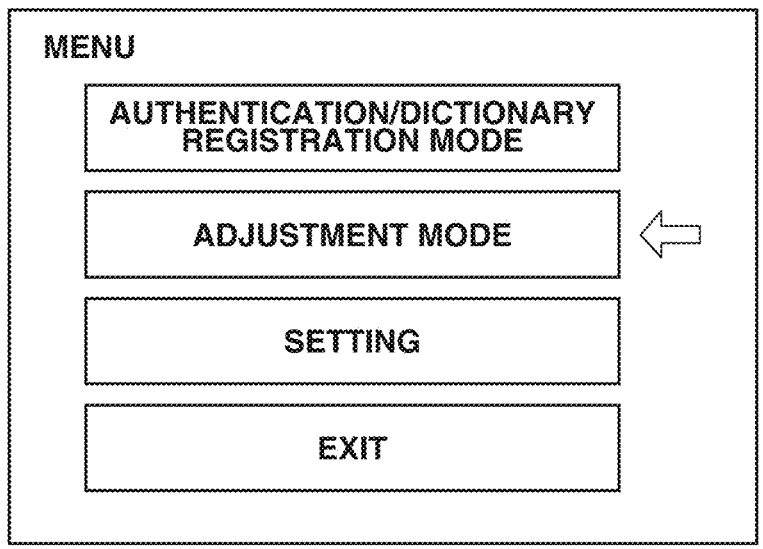
FIG. 4 illustrates a console screen to be displayed by a display apparatus.

FIG. 4 illustrates an example of a console screen to be displayed by the display apparatus 6 of the image authentication system 10 in the first exemplary embodiment. As illustrated in FIG. 4, a menu that includes "authentication/dictionary registration mode", "adjustment mode", "setting", and "exit" is displayed in the console screen, and which processing is to be executed can be selected. In general, an administrator who operates the image authentication apparatus 1 (hereinafter simply referred to as "administrator") selects the processing from the menu via the input apparatus 7. In the illustrated example, the processing to be described below is executed by selection of either "authentication/dictionary registration mode" or "adjustment mode". Various settings of the monitoring system of the first exemplary embodiment can be changed by selection of "setting". The operation of the image authentication system 10 of the first exemplary embodiment ends when "exit" is selected.

Authentication Processing

First, the authentication processing will be described. In the authentication processing, the image authentication apparatus 1 of the first exemplary embodiment controls the gate G by performing image authentication while obtaining image data of a human figure through image capturing by the image capturing apparatus 3. The processing is executed by selection of "authentication/dictionary registration mode" from the console screen in FIG. 4. The authentication processing is also performed in the image capturing apparatus 8 in parallel, but the operation of the image capturing apparatus 8 is similar to the operation of the image capturing apparatus 3 and therefore will not be described. During the authentication processing, the image capturing apparatuses 3 and 8 each continuously perform image capturing. Further, the authentication processing proceeds based on an input acquired via the input apparatus 7. The input is each of a "termination instruction" for terminating the authentication processing and an "authentication instruction" for continuously executing authentication. These two inputs can be received anytime during the authentication processing.

Figure 5:
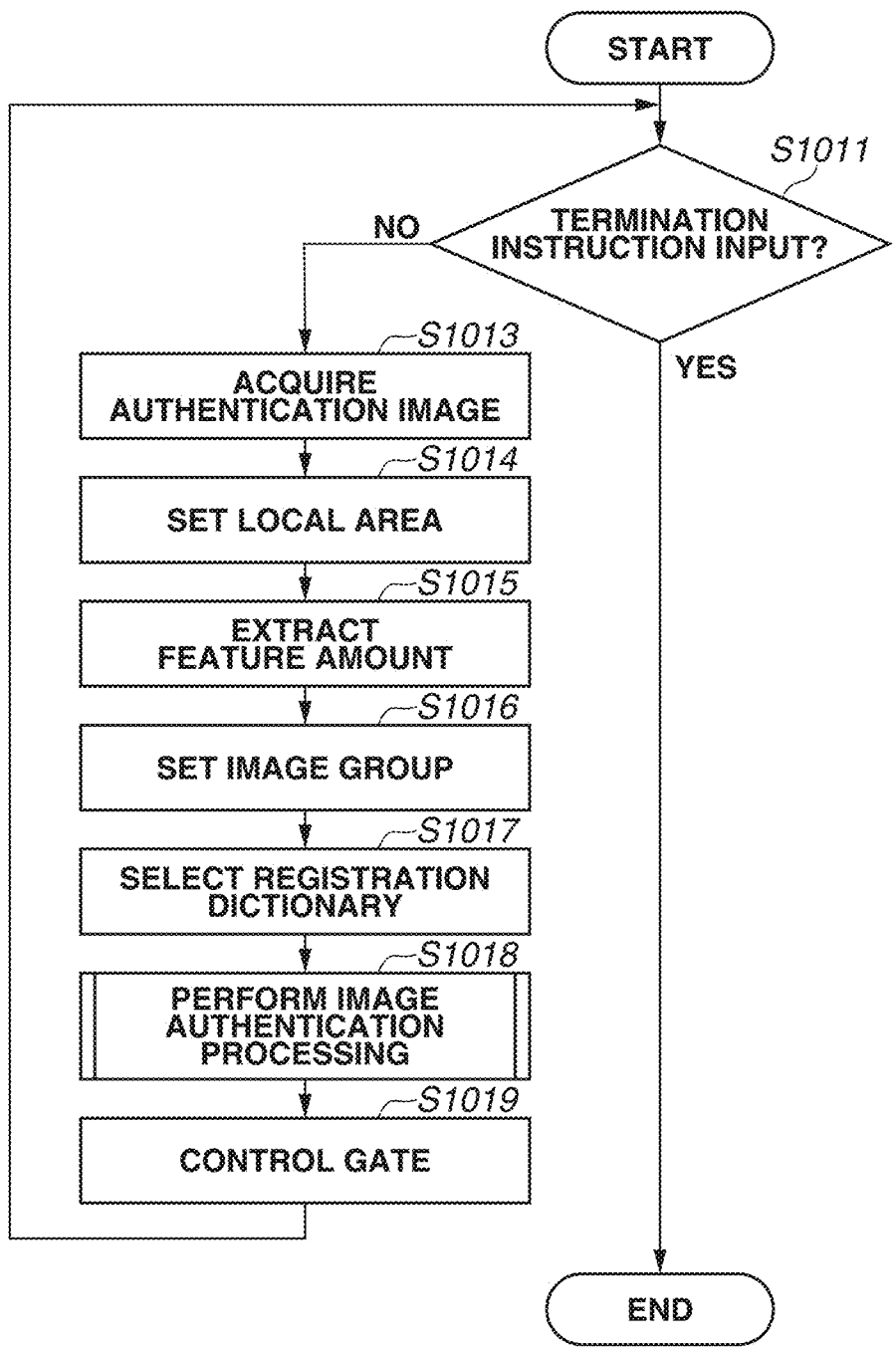
FIG. 5 illustrates a flowchart representing authentication processing to be executed by the image authentication apparatus.

FIG. 5 illustrates a flowchart representing the authentication processing to be executed by the image authentication apparatus 1. Actual processing will be described below in detail with reference to the drawing. Unless otherwise specified, the CPU 11 executes each step using the unit such as the authentication image acquisition unit 101.

In step S1011, the authentication image acquisition unit 101 determines whether the "termination instruction" is input. If the "termination instruction" is input (YES in step S1011), the processing flow ends. If the "termination instruction" is not input (NO in step S1011), the processing proceeds to step S1013. In step S1013, the authentication image acquisition unit 101 acquires an authentication image from the image capturing apparatus 3. As described above, the authentication image is an image in which the face of a human figure appears. The authentication image acquisition unit 101 acquires a captured image from the image capturing apparatus 3, detects the face of a human figure in the captured image, and clips the detected face of the human figure, so that the authentication image acquisition unit 101 can acquire the authentication image. The captured image may be recorded in the secondary storage device 14, and the authentication image acquisition unit 101 may read out the captured image from the secondary storage device 14 as necessary in the process. Any conventional technology can be used for the detection of the face of the human figure from the captured image. Such a technology is discussed in "P. Viola and M. Jones, "Robust real-time face detection", pp. 747, Eighth International Conference on Computer Vision (ICCV'—Volume 2, 2001".

A face image of a user is clipped from the captured image, based on the coordinates of the face detected by the authentication image acquisition unit 101, on the image. In the first exemplary embodiment, image normalization is performed to stabilize in-plane rotation of the face with respect to an image plane. For example, processing such as rotating the image so that a straight line connecting both eyes of the face is horizontal to the image may be performed. In the first exemplary embodiment, the entire range of the image is used as a processing target, but an image range may be specified beforehand and only a face within the range may be used as the processing target.

Next, in step S1014, the local area setting unit 102 sets a local area with respect to all authentication images. In the first exemplary embodiment, first, the local area setting unit 102 detects a characteristic area, e.g., an organ position of the face such as the position of an eye or nose, and sets the local area based on the detected organ position.

Figure 6:
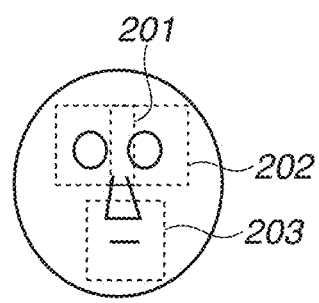
FIG. 6 is a diagram illustrating a local area set in an authentication image.

FIG. 6 is a diagram schematically illustrating the local area set in the authentication image. As illustrated in FIG. 6, the right eye is set as a local area 201, the left eye is set as a local area 202, and the mouth is set as a local area 203, with respect to a face image serving as the authentication image.

In the first exemplary embodiment, a rectangular area having the detected organ position in the center is set as the local area, but any other method may be used as the method for setting the local area. Alternatively, a technique not using the rectangular area having the organ position in the center can be adopted. For example, an area based on a position away from the organ position by a predetermined number of pixels may be set. Alternatively, instead of the rectangular area, a circular area may be set. A predetermined area of a face image may be set beforehand without reference to the detected organ position. The number of the local areas is not limited to these examples, and a plurality of local areas may be set for one organ position. Any conventional technology can be used for the method for detecting the organ position. For example, a technology discussed in Japanese Patent Application Laid-Open No. 2009-211177 can be used.

In step S1015, the feature extraction unit 103 extracts a feature amount from each of the local areas of the authentication image. A conventional technology can be used in the method for extracting the feature amount. For example, a Local Binary Pattern (LBP) feature amount can be used. Further, a Histogram of Oriented Gradients (HOG) feature amount, or a Scale-Invariant Feature Transform (SIFT) feature amount may be used. Alternatively, a feature amount in which these feature amounts are mixed may be used. Furthermore, a feature amount extracted based on a convolutional neural network (CNN) learned beforehand may be used. Further, the extracted feature amount may be subjected to dimension reduction through use of an analysis such as a principal component analysis (PCA).

In step S1016, the image group setting unit 104 defines a group for a feature amount beforehand, and determines to which group the acquired feature amount belongs and sets the result of the determination. To which group the acquired feature amount belongs is determined based on a variable factor of the image. Here, images are classified into groups based on time periods in which the authentication image is captured, i.e., certain lengths of time such as morning, afternoon, and night. An illumination condition of an image varies depending on the time period, in a place such as an outdoor location, an indoor location, or a doorway. Therefore, a group can be set for each illumination condition, by defining the group based on a predetermined condition, e.g., the above-described time period. In this way, the group can be set for each variable factor. The group may not be defined beforehand, and can be dynamically set by a method such as an existing clustering method, based on the acquired image.

In step S1017, the dictionary registration unit 105 selects a registration dictionary corresponding to the feature amount extracted in step S1015 among registration dictionaries, based on the information about the set group. The registration dictionaries are classified into a plurality of groups, and the dictionary registration unit 105 selects a registration dictionary in a group that is the same as the group to which the feature amount extracted in step S1015 belongs. In a case where there is no registration dictionary in the same group, a registration dictionary of another group is used as a substitute. The group of the registration dictionary will be described in detail below. Next, in step S1018, the image authentication processing is performed. The image authentication processing will be described below.

Figure 7:
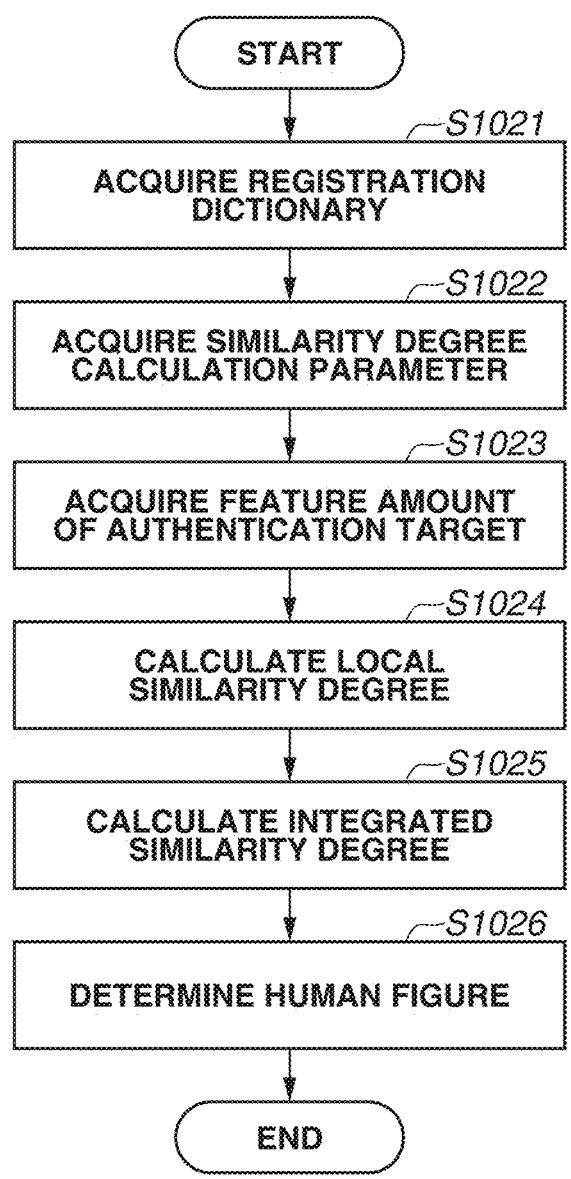
FIG. 7 illustrates a flowchart representing image authentication processing.

In step S1019, after the image authentication processing is performed in step S1018, the control apparatus 4 controls opening and closing of the gate G based on the authentication result acquired from the image authentication unit 109. In a case where a human figure corresponding to the feature amount matches any one of human figures registered in the registration dictionary, the control apparatus 4 opens the gate G and keeps the gate G closed otherwise. The CPU 11 executes step S1011 again to repeat the above-described steps, until the "termination instruction" is input so that the determination in step S1011 results in YES. The authentication processing is thus executed. Next, the image authentication processing in step S1018 will be described in detail. FIG. 7 illustrates a flowchart representing the image authentication processing in the first exemplary embodiment.

In step S1021, the similarity degree calculation unit 108 acquires the registration dictionary selected in the manner described above, from the dictionary registration unit 105. As described above, the registration dictionary is a dictionary in which data indicating a human figure to be authenticated is registered beforehand. Here, the registration is completed beforehand. The registration processing will be described below. Next, in step S1022, the similarity degree calculation unit 108 acquires a similarity degree calculation parameter from the similarity degree calculation parameter storage unit 107. The similarity degree calculation parameter is computed beforehand and stored in the similarity degree calculation parameter storage unit 107. In the process, the similarity degree calculation unit 108 selects a similarity degree calculation parameter corresponding to the group set in step S1016. In a case where there is no corresponding similarity degree calculation parameter, another similarity degree calculation parameter is selected. The method for computing the similarity degree calculation parameter will be described below.

In step S1023, the similarity degree calculation unit 108 acquires a feature amount of an authentication target from the image group setting unit 104. As described above, the feature amount to be acquired in the process is at least one or more feature amounts acquired from a plurality of authentication images. One feature amount corresponds to the face of one human figure. Further, in the first exemplary embodiment, because the feature amount is extracted for each of a plurality of local areas for one face, one feature amount includes the feature amount of each of the plurality of local areas.

In step S1024, the similarity degree calculation unit 108 calculates a local similarity degree, for the combination of each of all the feature amounts of the authentication target and the registration dictionary. The local similarity degree is a similarity degree calculated for each of the local areas. As described above, because the feature amount of the authentication target and the registration dictionary correspond to the feature amount extracted for each of the local areas, the similarity degree is calculated for each of the local areas. The method for calculating the local similarity degree for one of the local areas will be described below.

A conventional technology can be used for a similarity degree calculation method. For example, the following cosine similarity degree can be used.

$$S = \cos\theta = x' \cdot y' / |x'||y'| \quad (1)$$

Here, "." indicates an inner product of a vector, and "S" indicates the degree of similarity between feature amount vectors x' and y'. Further, the feature amount vectors x' and y' are expressed as follows.

$$x' = x_c - \mu_c \quad (2)$$

$$y' = y - \mu_c \quad (3)$$

Here, "$x_c$" indicates a feature amount vector extracted from an authentication image captured by a camera c. Further, "y" indicates a feature amount vector registered in a registration dictionary. Furthermore, "$\mu_c$" is a vector that defines an origin point for angle calculation. In other words, equation (1) measures a cosine similarity degree between the feature amount vectors $x_c$ and y, based on an angle between feature amount vectors obtained by using the origin point defined from $\mu_c$. This $\mu_c$ is the similarity degree calculation parameter in the first exemplary embodiment. The similarity degree calculation parameter $\mu_c$ can be computed by a technique such as averaging the feature amount vector $x_c$. The method for the computation will be described in detail below. The method for calculating the similarity degree for the one local area is described above, and a similarity degree is calculated likewise for other local areas.

In step S1025, the similarity degree calculation unit 108 calculates an integrated similarity degree based on the calculated local similarity degree, for the combination of each of all the feature amounts of the authentication target and the registration dictionary. The integrated similarity degree is a similarity degree determined by integrating a plurality of local similarity degrees for the respective local areas. A conventional technology can be used for the method of the integration. For example, a technique using an average of local similarity degrees or a technique of selecting a maximum value for local similarity degrees can be used. Besides, a weight for each of the local areas may be computed beforehand and the local similarity degrees may be integrated based on the weighted mean. In the first exemplary embodiment, the calculation of the local similarity degree in step S1024 and the calculation of the integrated similarity degree in step S1025 that are combined will be referred to as similarity degree calculation.

In step S1026, for all the feature amounts of the authentication target, the image authentication unit 109 determines which one or whether none of the human figures registered in the registration dictionary matches the human figure corresponding to the feature amount, based on the integrated similarity degree. Specifically, the image authentication unit 109 determines whether the highest integrated similarity degree among the integrated similarity degrees of the human figures registered in the registration dictionary is greater than a predetermined threshold. In a case where the highest integrated similarity degree is greater than the threshold, the image authentication unit 109 determines that the human figure corresponding to the feature amount matches the human figure included in the registration dictionary and corresponding to the integrated similarity degree. In contrast, in a case where the highest integrated similarity degree is less than or equal to the threshold, the image authentication unit 109 determines that the human figure corresponding to the feature amount matches none of the human figures in the registration dictionary. Upon completion of the determination in step S1026, the image authentication processing in FIG. 7 ends.

As described above, the registration dictionary belonging to a group that is the same as the group of the authentication image and the similarity degree calculation parameter are used, so that authentication accuracy improves. The image authentication processing is executed for all the authentication images acquired in step S1013 in the authentication processing flow in FIG. 5. However, some of the authentication images may be selected and the image authentication processing may be performed for the selected authentication images. For example, the authentication images may be thinned out at predetermined interval, or clustering may be performed for the feature amounts extracted from the authentication images and the image authentication processing may be performed for a feature amount selected as a representative from one cluster.

Similarity Degree Calculation Parameter Computing Processing

Next, processing will be described in which the image authentication apparatus 1 of the first exemplary embodiment computes a similarity degree calculation parameter corresponding to each of the image capturing apparatuses 3 and 8 that are installed. The processing is executed by selection of "adjustment mode" in the console screen in FIG. 4. In the first exemplary embodiment, a human figure captured by each of the image capturing apparatuses 3 and 8 is recorded automatically, i.e., without requiring an instruction from the user, into the secondary storage device 14, and a feature amount is extracted. When a feature-amount collection status satisfies a predetermined condition, e.g., when a predetermined number of feature amounts are collected, a similarity degree calculation parameter is computed.

It is desirable that the processing be executed before the execution of the authentication processing described above. However, in a case where it is difficult to perform such execution, the processing may be executed simultaneously with the authentication processing. In this case, at first, the authentication processing is performed by using a similarity degree calculation parameter prepared beforehand. Afterward, when calculation of a new similarity degree calculation parameter is completed, the new similarity degree calculation parameter is used.

Figure 8:
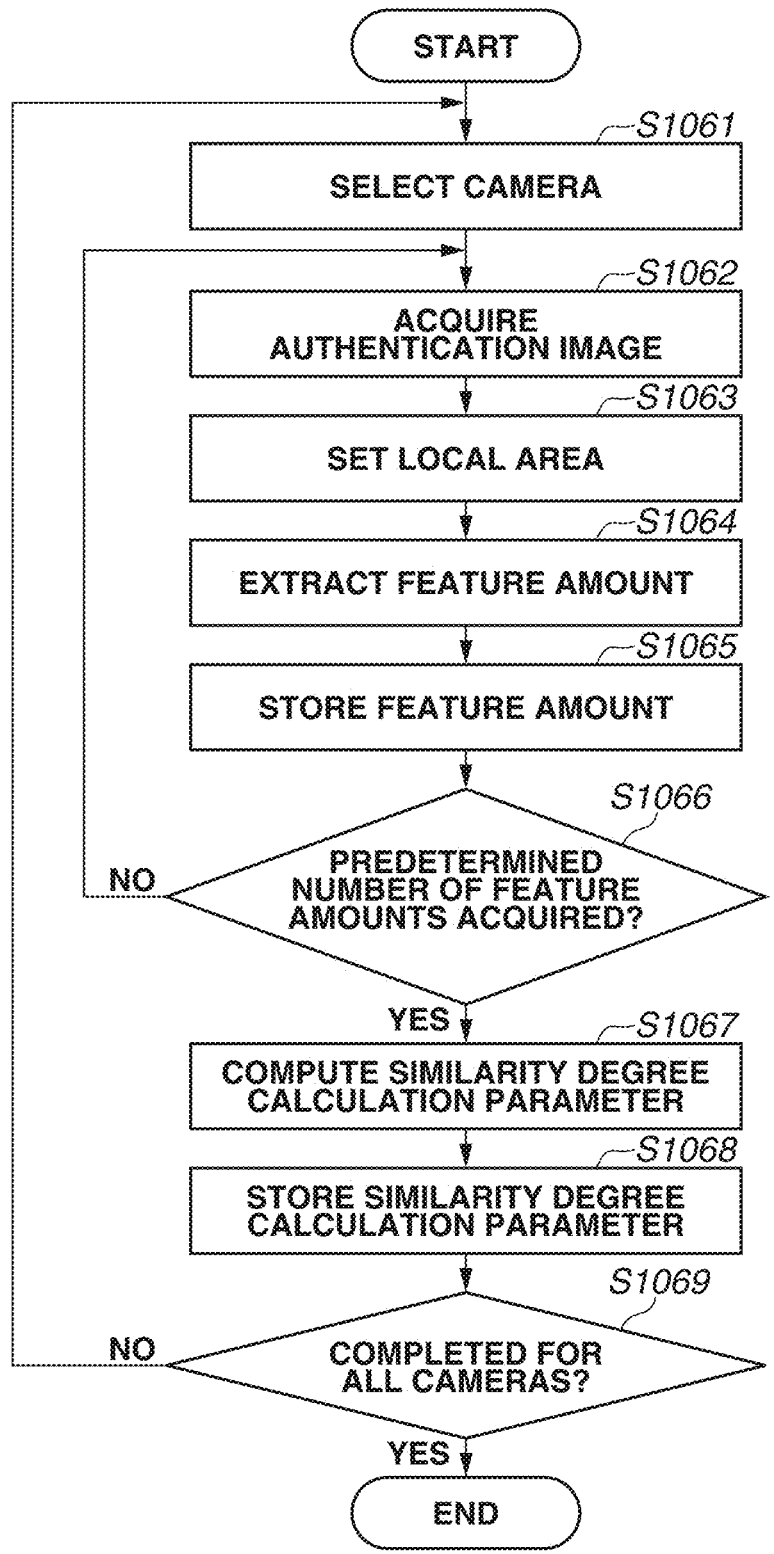
FIG. 8 illustrates a flowchart representing similarity degree calculation parameter computing processing.

FIG. 8 illustrates a flowchart representing the similarity degree calculation parameter computing processing. Actual processing will be described in detail below with reference to the drawing. Each of the image capturing apparatuses 3 and 8 continues capturing images at a predetermined frame rate from the start to the end of the flow, and continues storing the captured images into the secondary storage device 14.

In step S1061, the authentication image acquisition unit 101 selects one image capturing apparatus (camera) in which the computation of a similarity degree calculation parameter is not completed. Next, in step S1062, the authentication image acquisition unit 101 selects an image captured by the camera selected in step S1061 among the images stored in the secondary storage device 14, and acquires an authentication image from the captured image. The method for acquiring the authentication image from the captured image is similar to the method in the authentication processing described above and therefore will not be described. In the first exemplary embodiment, the captured image stored in the secondary storage device 14 is acquired, but the captured image may be directly acquired from each of the image capturing apparatuses 3 and 8. Local area setting in step S1063 and feature amount extraction in step S1064 are similar to the corresponding methods described above and therefore will not be described.

In step S1065, the image group setting unit 104 sets a group with respect to the extracted feature amount, and stores the set group and the feature amount in association with each other into the secondary storage device 14. Next, the image group setting unit 104 changes the processing based on the status of the collection of the feature amounts extracted for each group. Specifically, in step S1066, the image group setting unit 104 determines whether a predetermined number of feature amounts are acquired. If the number of the collected feature amounts is less than the predetermined number (NO in step S1066), the processing returns to step S1062. If the number of the collected feature amounts is sufficient for computation of the similarity degree calculation parameter (YES in step S1066), the processing proceeds to step S1067. The image group setting unit 104 thus repeats the steps for collection (extraction and storage) of the feature amounts until the number of the feature amounts reaches the predetermined number. In this way, in the first exemplary embodiment, the collection of the feature amounts ends when the number of the feature amounts reaches the predetermined number. However, another technique may be used. For example, the collection may end when the feature amounts are collected up to a predetermined proportion. Alternatively, authentication may be performed for matching between a human figure corresponding to the feature amount and a human figure registered in the registration dictionary, and the collection may end if the result of the authentication reaches a predetermined error rate.

Afterward, in step S1067, the similarity degree calculation parameter computing unit 106 computes a similarity degree calculation parameter, using the collected feature amounts, for each group. How the similarity degree calculation parameter is computed in step S1067 will be described below. In step S1068, the similarity degree calculation parameter storage unit 107 stores the computed similarity degree calculation parameter. Subsequently, in step S1069, the similarity degree calculation parameter computing unit 106 determines whether the similarity degree calculation parameter computing processing corresponding to each of all the cameras is completed. If the similarity degree calculation parameter computing processing is completed (YES in step S1069), the similarity degree calculation parameter computing processing ends. If there is a camera for which the similarity degree calculation parameter computing processing is not completed (NO in step S1069), the processing returns to step S1061.

The processing for computing the similarity degree calculation parameter in step S1067 will be described. As described above, the similarity degree calculation parameter in the first exemplary embodiment is the origin point of the cosine similarity degree. A method for computing a similarity degree calculation parameter of a certain group, corresponding to a certain local area, will be described below. An origin point $\mu_c$ corresponding to a camera c is calculated by averaging feature amount vectors $x_{ci}$, collected for each of the installed cameras, as in the following equation (4).

$$\mu_c = (1/N)\Sigma_i^N x_{ci} \quad (4)$$

Here, "$x_{ci}$" indicates an ith feature amount vector among feature amount vectors collected from an authentication image captured by the camera c. Further, "N" is the number of samples of the collected feature amount vectors. By using the point origin $\mu_c$, i.e., the similarity degree calculation parameter, a similarity degree is calculated in monitoring/authentication processing.

Figure 9:
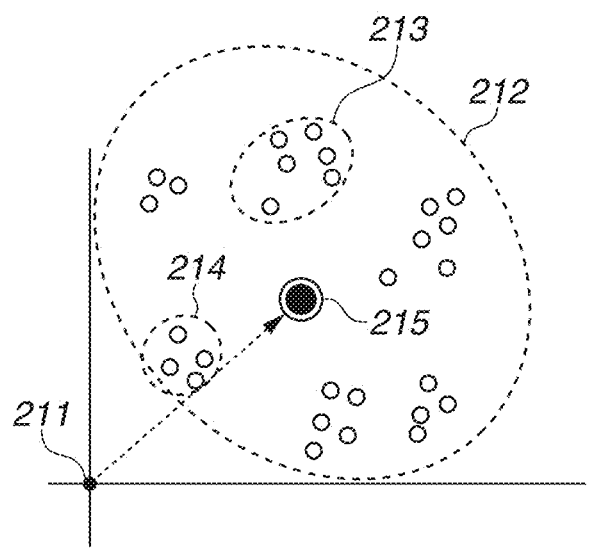
FIG. 9 is a diagram illustrating a feature amount vector space of a local area.

FIG. 9 is a diagram illustrating a feature amount vector space of a certain local area, captured by a certain camera. FIG. 9 schematically illustrates an effect produced by computing an origin point. FIG. 9 illustrates an origin point 211 determined beforehand and an origin point 215 computed based on authentication images collected by the installed camera. Each white circle indicates a feature amount vector, and a set of feature amount vectors, i.e., a cluster, is indicated by a dotted line. In the drawing, a feature amount vector cluster 212 of authentication images collected by the installed camera, a feature amount vector cluster 213 of a human figure A, and a feature amount vector cluster 214 of a human figure B are each illustrated as the cluster indicted by the dotted line.

As illustrated in FIG. 9, the white circles each indicating the feature amount vector are all dispersed in the first quadrant of the graph. Meanwhile, in a case where a similarity degree is calculated based on an angle between feature amount vectors as with the cosine similarity degree, a resolving power for distinguishing feature amount vectors is high if the origin point is present inside a cluster formed of feature amount vectors of an authentication target.

The origin point 211 determined beforehand is present outside the cluster formed of the feature amount vectors of the authentication target, and is not always present inside the cluster. For example, if an angle between a feature amount vector of the human figure A (any one of the feature amount vectors in the feature amount vector cluster 213) and a feature amount vector of the human figure B is measured with reference to the origin point 211 determined beforehand, the angle is close to 0. Therefore, if a cosine similarity degree is calculated in a state where the origin point 211 is present outside the cluster formed of the feature amount vectors as illustrated in FIG. 9, a high similarity degree that is likely to result in determination of another person as the authentic person by mistake can be calculated.

Therefore, although the origin point 211 being present inside the cluster formed of the feature amount vectors is desirable, the origin point 211 is not always present inside the cluster because, in general, the origin point 211 is calculated based on a large number of authentication images prepared beforehand. The feature amount vector distribution of the authentication images collected by the installed camera is different from the feature amount vector distribution of the authentication images prepared beforehand, in some cases. In particular, because the installed camera is limited in terms of viewing angle and location, a large number of images under a specific illumination condition and images including faces in a specific direction are captured by the installed camera, as compared with the authentication images prepared beforehand. In such a case, the origin point 211 is located outside the cluster formed of the feature amount vectors as illustrated in FIG. 9 and thus, an incorrect high similarity degree is calculated as described above. This can lead to false authentication.

Therefore, the origin point 215 computed based on the authentication images collected by the installed camera is used in place of the origin point 211 computed beforehand, so that the origin point is located inside the feature amount vector cluster 212 of the authentication images collected by the installed camera. A cosine similarity degree can be thereby calculated by using an origin point suitable for authentication for each installation location of the camera, so that a reduction in false authentication is expected.

Figure 10:
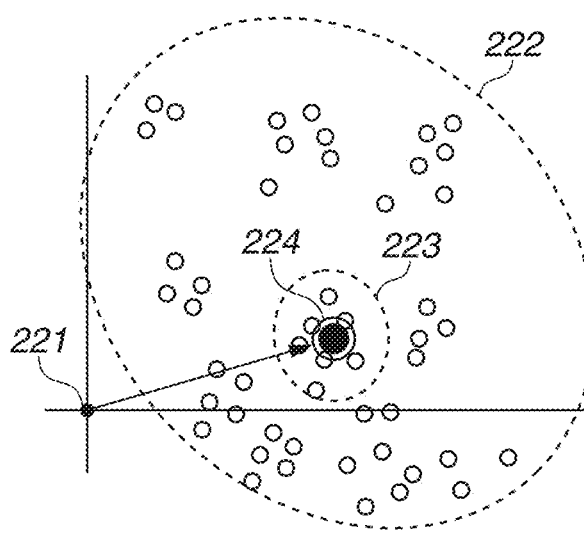
FIG. 10 is a diagram illustrating a feature amount vector space of a local area.

However, the origin point computed based on the authentication images collected by the installed camera is not always present at a position suitable for authentication within a feature space. FIG. 10 is a diagram illustrating a feature amount vector space. FIG. 10 illustrates an origin point 221 determined beforehand, a feature amount vector cluster 222 of authentication images collected by an installed camera, a feature amount vector cluster 223 of a human figure C, and an origin point 224 computed based on authentication images collected by an installed camera. In this case, the origin point 221 determined beforehand is not suitable for calculation of a cosine similarity degree, as with the case illustrated in FIG. 9. However, the origin point 224 computed based on the authentication images collected by the installed camera is present inside the feature amount vector cluster 223 of the human figure C.

In this case, if a cosine similarity degree is calculated, such false authentication that the human figure C of the feature amount vector cluster 223 is determined as an authentic person by mistake can occur. In this way, in a case where the computed origin point is present inside the feature amount vector cluster of someone else, the origin point is not suitable for authentication.

Therefore, instead of extracting one feature amount for one authentication image, a plurality of feature amounts is extracted by setting a plurality of local areas, and similarity degrees of the respective feature amounts are eventually integrated. This reduces false authentication that occurs in a case where there is a local area in which the computed similarity degree calculation parameter is not suitable for authentication. Therefore, even if a high similarity degree likely to result in determination of someone else to be an authentic person is obtained based on a similarity degree calculation parameter unsuitable for authentication in a certain local area, a similarity degree calculation parameter suitable for authentication can be computed in the other local areas. Further, because these similarity degree calculation parameters of local areas are eventually integrated, a reduction in false authentication can be expected.

The plurality of feature amounts is extracted by setting the plurality of local areas, but the plurality of feature amounts may be extracted by another method. For example, the plurality of feature amounts may be extracted by extracting different types of feature amounts. In the first exemplary embodiment, the average of the feature amount vectors is used as the origin point. However, the origin point may be computed by another method. For example, in place of a simple average of the feature amount vectors, a weighted mean may be used. In this case, the value of a weight may be normalized such that an origin point is located inside a cluster formed of feature amount vectors for authentication.

As described above, the similarity degree calculation parameter corresponding to one local area and one group is computed. The computation technique is applied to all the other local areas and groups.

Figure 11:
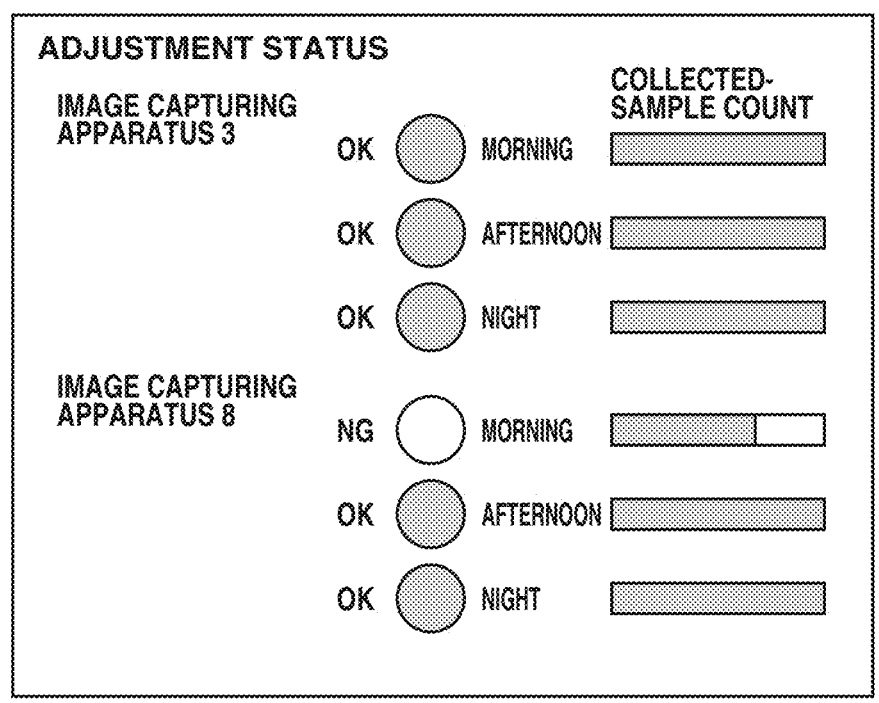
FIG. 11 is a diagram illustrating a screen to be displayed for a user during execution of the similarity degree calculation parameter computing processing.

FIG. 11 is a diagram illustrating a screen to be displayed for a user, during the execution of the similarity degree calculation parameter computing processing. The user in the processing is, in general, an administrator who operates the image authentication system 10, although the user is not limited to the administrator. The display screen displays a status of collection of feature amounts for adjusting the similarity degree calculation parameter. In this example, a collected-sample count indicates "OK" for all groups in the image capturing apparatus 3. This indicates that a sufficient number of feature amounts are collected to compute the similarity degree calculation parameter, for all the groups. In contrast, the example indicates that the collected-sample count is still insufficient in the group of morning, for the image capturing apparatus 8. In this way, the collection of a predetermined number of images is displayed for the user, so that the user can visually recognize how many images still need to be collected, and thus the convenience increases.

In the first exemplary embodiment, the similarity degree calculation parameter computing processing has been described not to be completed without computation of the similarity degree calculation parameter. However, the similarity degree calculation parameter computing processing may be suspended before completion of the computation of the similarity degree calculation parameter. In this case, the similarity degree calculation parameter to be used for the authentication processing is prepared beforehand by another method. For example, a default similarity degree calculation parameter prepared beforehand may be used. Alternatively, the similarity degree calculation parameter may be computed in a state where a predetermined number is not reached. Still alternatively, feature amounts that still need to be collected for computation may be collected in the background of the authentication processing, and the similarity degree calculation parameter may be computed when the predetermined number is reached. In this case, a default similarity degree calculation parameter prepared beforehand is used until the computation of the similarity degree calculation parameter is completed, and the default similarity degree calculation parameter is replaced with the computed similarity degree calculation parameter upon completion of the computation.

Dictionary Registration Processing

Next, the dictionary registration processing for registering a human figure to authenticate will be described. In the first exemplary embodiment, a case will be described where the image capturing apparatus 3, i.e., a camera that is the same as the camera used in the above-described authentication processing, acquires an authentication image that is an image to be registered in a dictionary. In this case, an image captured under imaging conditions (such as an illumination condition and a face direction) that are the same as imaging conditions in an authentication location can be registered in a dictionary, so that an improvement in the authentication accuracy can be expected. A camera for dictionary registration may be installed in another location. In this case, however, because the imaging conditions are different from the imaging conditions in a monitoring and authentication location, it is necessary to be careful about whether the authentication accuracy is sufficient. A case where the image capturing apparatus 8 is used is similar and therefore will not be described.

A case where an authentication subject who enters and exits through a gate performs registration will be described. A user in the processing is the authentication subject.

Figure 12:
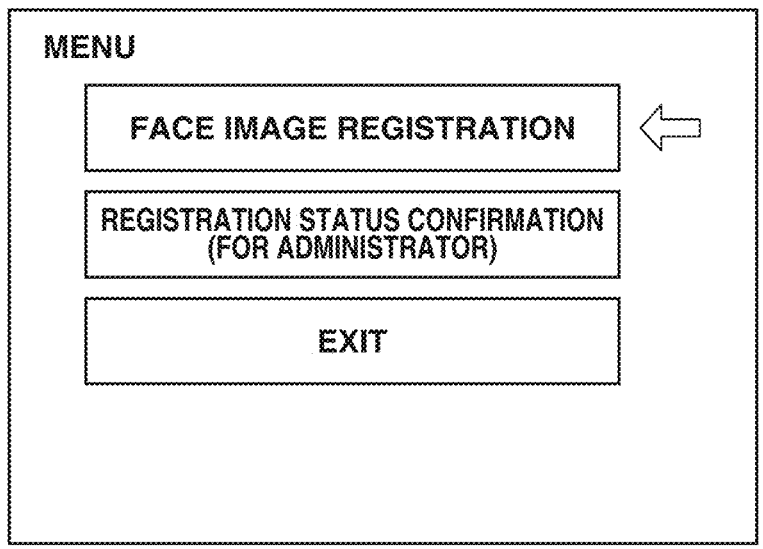
FIG. 12 is a diagram illustrating an example of a console screen to be displayed by a display image generation unit.

FIG. 12 illustrates a console screen to be displayed by the display image generation unit 110, in "authentication/dictionary registration mode". The user performs registration by selecting "face image registration" from a menu in the screen.

Figure 13:
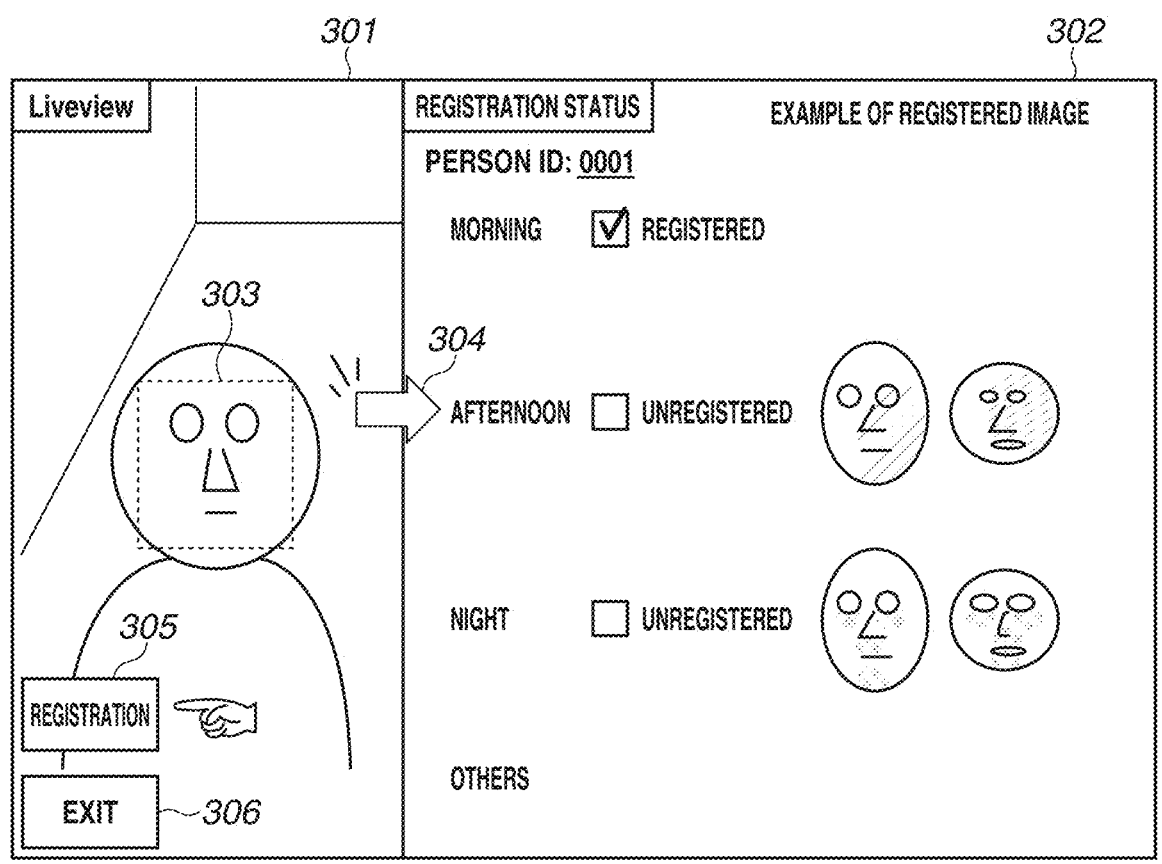
FIG. 13 is a diagram illustrating a video image to be output from the display image generation unit to the display apparatus.

FIG. 13 is a schematic diagram illustrating an example of a video image to be output from the display image generation unit 110 to the display apparatus 6 in the dictionary registration processing. In an area 301 on the left side of FIG. 13, an image acquired from the image capturing apparatus 3 is displayed as a live view. Because the live view is thus displayed, the user can perform dictionary registration while confirming how the face appears, so that the convenience of the user improves. To realize such dictionary registration, the image capturing apparatus 3 is disposed to face in the same direction as the screen of the display apparatus 6. The image displayed in the area 301 includes the face of the user, and an area 302 on the right side of FIG. 13 indicates a registration status, examples of a registered image, and a person ID. In the example illustrated in FIG. 13, the registration status includes "registered", "unregistered", and "others" displayed for each of morning, afternoon, and night for each person ID. Because the user visually recognizes the registration status, the user can confirm whether an authentication image including the face of the user is clipped from an image of the user captured by the image capturing apparatus 3, and whether the clipped image is registered, for each person ID, as well as for each of morning, afternoon, and night. In a lower-left part of FIG. 13, a registration button 305 and an exit button 306 being displayed are illustrated. The user inputs a registration request for performing the dictionary registration into the image authentication apparatus 1, by selecting the registration button 305, so that the dictionary registration processing begins. The user terminates the dictionary registration processing by selecting the exit button 306.

The user can recognize whether the dictionary registration has been performed for, for example, each of a plurality of states at the time of image capturing by the image capturing apparatus 3, such as morning, afternoon, and night, by viewing the registration status. Therefore, the user can perform registration by selecting a displayed state indicating that no dictionary registration has been performed for the user. It is therefore not necessary for the user to remember in which state the registration has been performed and thus, the convenience improves. Moreover, because a state that needs dictionary registration is displayed and the user is prompted to perform the dictionary registration for the displayed state, the dictionary registration is selectively performed for the state that needs the dictionary registration. Therefore, the dictionary registration is efficiently performed for the state that needs the registration of an authentication image and thus, the authentication accuracy improves.

Figure 14:
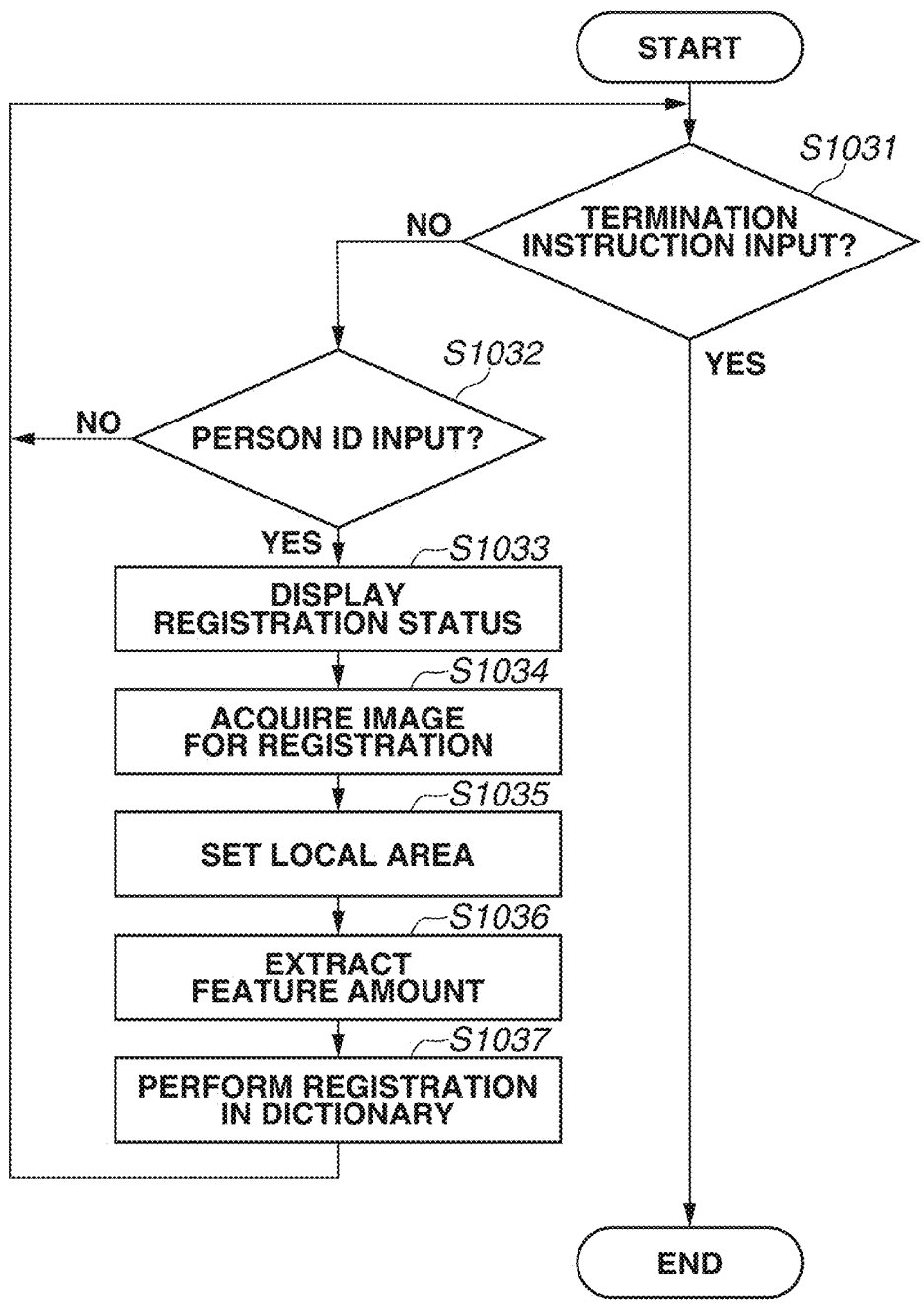
FIG. 14 illustrates a flowchart representing dictionary registration processing.

FIG. 14 illustrates a flowchart representing the dictionary registration processing. The dictionary registration flow will be described in detail below with reference to FIG. 14. As described above, the live view is displayed in the area 301 in FIG. 13, at the start of the processing in FIG. 14. Unless otherwise specified, the CPU 11 executes the processing in FIG. 14. In step S1031, the CPU 11 determines whether a termination instruction is input from the user by selection of the exit button 306 illustrated in the lower-left part of FIG. 13. If the termination instruction is input (YES in step S1031), the dictionary registration processing ends. If the termination instruction is not input (NO in step S1031), the processing proceeds to step S1032. In step S1032, the CPU 11 determines whether a person ID is input. If no person ID is input from the user (NO in step S1032), step S1031 is executed again. If a person ID is input (YES in step S1032), step S1033 to be described below is executed.

To avoid changing of the registration dictionary by someone else without permission, it is desirable to perform authentication of an authentic person when receiving an input of a person ID. For example, encrypted data indicating the person ID is stored in a contactless card, and the person can input the person ID by touching the card on a card reader, so that the authentication can be performed. The authentication of the person can be accurately performed unless the card of the person is stolen.

In step S1033, upon the input of the person ID, the CPU 11 displays a registration status corresponding to the person ID, using the display image generation unit 110. In the process, the CPU 11 acquires the registration status, using the registration status acquisition unit 111. The registration status is information that indicates an image registered for each human figure or the presence/absence of a feature amount. As described above, the area 302 illustrated in FIG. 13 indicates the example of a registration status to be displayed. As illustrated in FIG. 13, group information is displayed. Further, whether an image is registered or unregistered for each of morning, afternoon, and night for a human figure having a person ID "0001" is displayed. In the example, morning, afternoon, and night are defined and displayed as the group information, and an image is registered for morning, whereas no image is registered for each of afternoon and night.

Further, in the example illustrated in FIG. 13, the registered images of other human figures are displayed as the examples of the registered image on the right side, for each of afternoon and night for which no image is registered. Because the examples of the registered image are thus displayed, the user can recognize what kind of image is desirable for registration, so that the convenience improves.

Next, in step S1034, the CPU 11 acquires data representing an image for registration, using the authentication image acquisition unit 101. In the area 301 illustrated in FIG. 13, a face frame 303 is added to the appearing face in the previous stage. Therefore, the image is acquired as an image for registration by the selection of the registration button 305 by the user. The face frame 303 may be displayed by using a technology of the above-described face detection or the like. Before the registration button 305 is selected, an arrow 304 is provided to highlight to which one of the morning, afternoon, and night groups the face of the user is to be added by selection of "registration".

As described above, the registration dictionaries are classified into the plurality of groups that are the three groups of morning, afternoon, and night in the first exemplary embodiment. Because the registration dictionaries are thus classified into the groups corresponding to the different imaging conditions, the similarity degree calculation between the imaging conditions close to the imaging condition in the authentication can be performed, so that an improvement in accuracy can be expected. When the registration is performed, to which group the image is to be added is highlighted and displayed together with the registration status, so that the user can recognize to which group the image currently intended to be registered belongs. In addition, the user can visually recognize whether the image intended to be registered is an unregistered image, so that the convenience improves.

The image for registration is not necessarily an image captured by the image capturing apparatus 3 or 8, and an captured image beforehand may be used. Subsequent local area setting in step S1035 and feature amount extraction in step S1036 are similar to step S1014 and step S1015, respectively, in FIG. 5 described above and therefore will not be described.

Next, in step S1037, the CPU 11 registers the feature amount, using the dictionary registration unit 105. In this process, the CPU 11 performs determination and setting of the group, using the image group setting unit 104, and registers the set group in the dictionary, in association with the feature amount together with the input person ID described above.

Upon completion of the registration, the processing returns to step S1031.

The feature amount registered in step S1037 is used in the image authentication processing described with reference to step S1018 in FIG. 5, and step S1021 to step S1026 in FIG. 7. In the first exemplary embodiment, the time period defined as each of morning, afternoon, and night is used as the variable factor of an image, and grouping is performed based on these time periods. The registration status is acquired and the acquired registration status is displayed based on the groups. However, the grouping may be performed based on another variable factor. For example, the grouping may be performed based on time periods or times of day that are different from the time periods of morning, afternoon, and night and are set beforehand. For an environment of an outdoor location or an environment close to the outdoor location such as an indoor place covered with glass, the grouping may be performed based on the weather, because a light amount at the time of image capturing is affected by the weather in such an environment. For an indoor environment not affected by the weather, the grouping may be performed based on control of the light amount of illumination. In these examples, the grouping can be performed based on the light amount at the time of image capturing.

In the first exemplary embodiment, the similarity degree calculation parameter is computed by acquiring the authentication image from the image captured by the installed camera. Therefore, human figure authentication can be normally implemented, even in a case where the imaging conditions are different. Because the camera is installed, the imaging conditions such as the direction of a human figure to be imaged and the illumination condition are fixed to some extent. In particular, it is desirable that, by using a fixed camera, the position, the height, and the capturing angle of the camera at the time of image capturing be fixed, and the position at the time of imaging a human figure be fixed. Because the similarity degree calculation parameter dedicated to the imaging condition of the installation location of the camera is used, a human figure can be authenticated more accurately than in a case where a similarity degree calculation parameter is used which is prepared beforehand and for which a condition for the installation location of a camera is not determined.

In addition, in the dictionary registration processing, the current registration status is displayed for the user, by using an apparatus such as the display apparatus 6. Therefore, the user can understand what kind of image is desirable for registration and thus, the convenience improves.

In the first exemplary embodiment, the example has been described in which the authentication subject performs the registration in the dictionary by operating the console, but only the administrator may perform the operation for the registration. In this case, a human figure to be registered is positioned in front of the camera, and the administrator performs the registration processing by operating the console. In this case, because only the administrator performs the registration of a human figure in the registration dictionary, the security increases thanks to a reduction in risk such as tampering of the registration dictionary, although the convenience decreases.

In a case where the user performs the registration, additional registration of an image may be prompted if the gate is not opened due to an authentication failure. For example, the additional registration can be audibly prompted, or a screen for promoting the additional registration can be displayed at the display apparatus 6 or a display separately installed. In the first exemplary embodiment, the registration status is displayed in the dictionary registration processing, but there is a case where the administrator needs to confirm the registration status. For such a case, the administrator may be enabled to confirm the current registration status.

FIG. 15 is an example of a screen for confirmation of the registration status to be displayed when "registration status confirmation (for administrator)" in FIG. 12 is selected. As illustrated in FIG. 15, the group information (the morning, afternoon, and night groups) is displayed together with the person ID in the screen for confirmation. In the illustrated example, for a person ID "0001", an image is registered for each of the morning and afternoon groups, whereas no image is registered for the night group.

For a person ID "0002", the same image is registered for the morning and afternoon groups, and a different image is registered for the night group.

For a person ID "0003", an image is registered for the morning group, whereas no image is registered for the afternoon and night groups.

In this example, the number of registered images is displayed in each of the columns of the respective morning, afternoon, and night groups. As an example, in a display portion 701, "morning (25/30)" for the person ID indicates that 30 person IDs are registered, and registration for morning has been performed for 25 out of these 30 person IDs. The administrator can understand which group (among the morning, afternoon, and night groups in this example) has a small number of registered images by confirming this display screen. In general, in a time period with no registered image, authentication accuracy is expected to be lower than that in a time period with registered images.

Therefore, for a time period with a small number of registered images, measures such as changing the operation of the image authentication system (such as positioning a guard because non-authentication easily occurs) can be taken, so that the convenience can be improved.

Further, the administrator may be enabled to add an image of a user captured beforehand to the registration dictionary. In this case, an interface for inputting the image captured beforehand is prepared, and the image is input together with a person ID. This makes it possible to display into which group the image is to fall.

In the first exemplary embodiment, the group names (morning, afternoon, and night) are displayed as the group information, but other information may be displayed. For example, the morning, afternoon, and night groups may each be more specifically defined and displayed. For instance, the morning group may be a time period of 6:00 a.m. to 11:00 a.m. In a case where the groups are not defined beforehand and are dynamically defined from an image, the groups may be provided with convenient names such as group 1 and group 2, and displayed.

In the first exemplary embodiment, the cosine similarity degree is used as the similarity degree, and the origin point in the calculation of the cosine similarity degree is computed as the similarity degree calculation parameter, but other similarity degree may be used. For example, as represented by the following equations, the reciprocal number of a Mahalanobis distance may be used as a similarity degree S, and a Mahalanobis matrix M may be computed as the similarity degree calculation parameter.

$$S = 1/D_M \qquad (5)$$

$$D_M = \sqrt{\{(x_c-y)^T M_c^{-1}(x_c-y)\}} \qquad (6)$$

Figure 16:
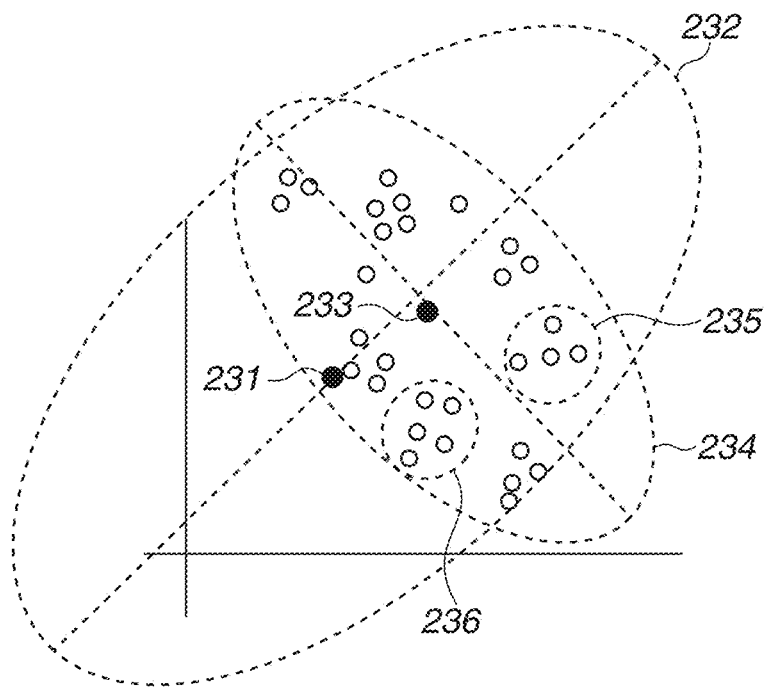
FIG. 16 is a diagram illustrating a feature amount vector space where a Mahalanobis matrix is used as a similarity degree calculation parameter.

Here, $x_c$ and y indicate a feature amount vector of a human figure imaged by a camera c and a feature amount vector of a registration dictionary, respectively. FIG. 16 is a diagram illustrating a feature amount vector space in which a Mahalanobis matrix is used as the similarity degree calculation parameter, and illustrates an effect of using the Mahalanobis matrix. FIG. 16 illustrates a distribution of feature amount vectors as with FIG. 9 and FIG. 10. FIG. 16 illustrates a mean vector 231 computed beforehand, a distance space 232 based on a Mahalanobis matrix computed beforehand, and a mean vector 233 computed as a new value based on authentication images collected by the installed camera. Further, FIG. 16 also illustrates a distance space 234 based on a computed new Mahalanobis matrix, a feature amount vector cluster 235 of a human figure D, and a feature amount vector cluster 236 of a human figure E.

The distance space 232 indicates that the Mahalanobis distances from the mean vector 231 computed beforehand are equal on the ellipse of the distance space 232. In other words, in the Mahalanobis distance of the distance space 232, a distance in a diagonal direction from a lower left part to an upper right part of FIG. 16 has a shorter distance scale than in a normal Euclidean distance. This also applies to the distance space 234 in which a distance from an upper left part to a lower right part of FIG. 16 has a shorter distance scale than in a normal Euclidean distance. In this way, the distance scale computed beforehand and the distance scale computed from the authentication images collected by the installed camera are different.

In FIG. 16, in the distance space 232 based on the Mahalanobis matrix computed beforehand, the distance from the lower left part to the upper right part of FIG. 16 has the short distance scale. Therefore, the Mahalanobis distance between the feature amount vector of the human figure D (any one point within the feature amount vector cluster 235 of the human figure D) and the feature amount vector of the human figure E are close, and thus, both can be determined as the same human figure. However, on the contrary, in the distance space 234 based on the computed new Mahalanobis matrix, the distance between the feature amount vector of the human figure D and the feature amount vector of the human figure E is long and thus, both are highly likely to be determined as different persons. In this way, the technique of the first exemplary embodiment can also be applied to the technique of setting the similarity degree calculation parameter in preliminary learning, such as based on the Mahalanobis distance.

In addition, in the first exemplary embodiment, the authentication target is the face of a human figure, and the authentication image is an image where a face appears. However, the authentication subject is not limited to the face, and may be an image where a human body or another object appears. As described above, in the first exemplary embodiment, the authentication is performed by using the authentication scheme in which the system administrator registers the authentication subject in the dictionary and which uses the local area.

In the first exemplary embodiment, the example has been described in which the similarity degree calculation parameter is computed by using the feature amounts collected from the captured image. In a second exemplary embodiment, an example in which a similarity degree calculation parameter is computed in dictionary registration processing will be described. In the following description, processing similar to the processing in the first exemplary embodiment will not be described.

Figure 17:
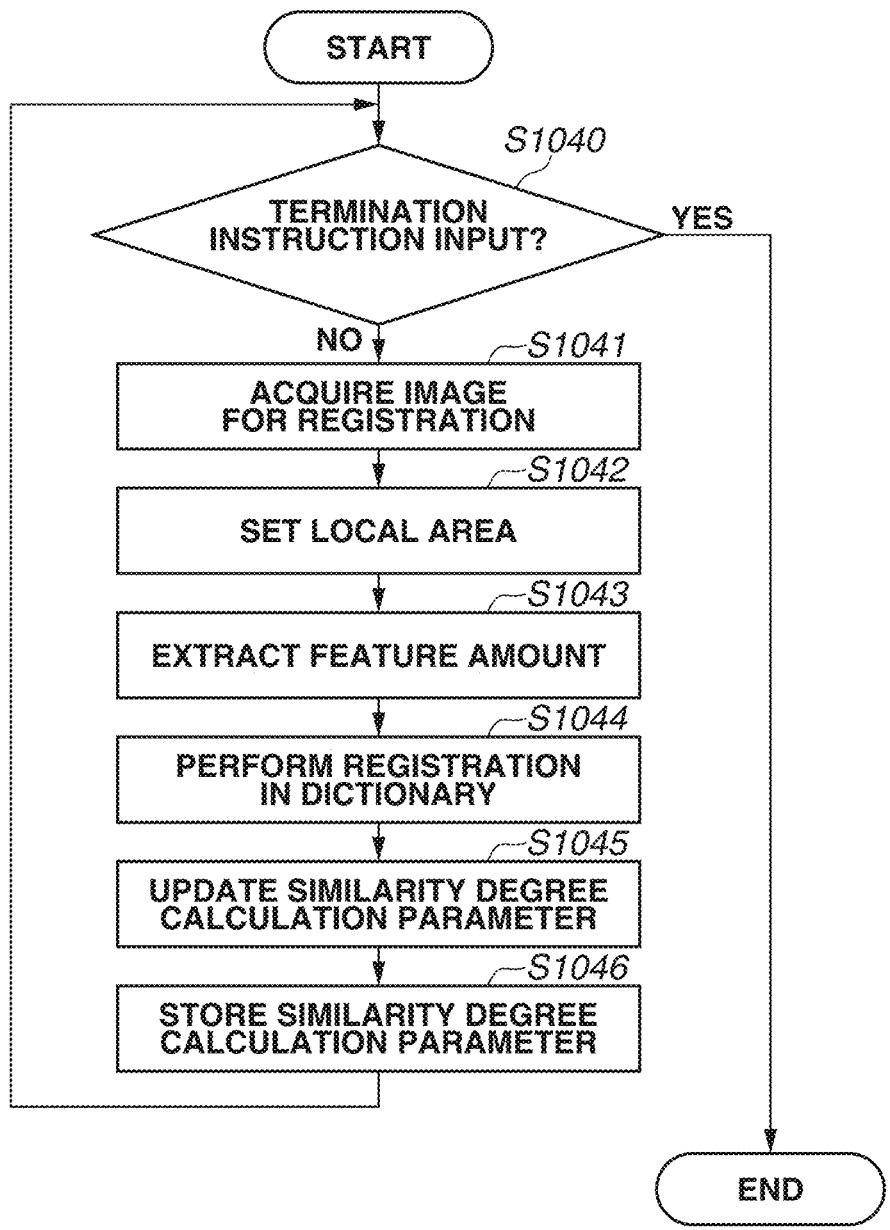
FIG. 17 illustrates a flowchart representing dictionary registration processing.

First, an example will be described in which, as with the first exemplary embodiment, a cosine similarity degree is used as a similarity degree in computing the similarity degree calculation parameter in the dictionary registration processing. Monitoring/authentication processing and similarity degree calculation parameter computing processing are similar to those in the first exemplary embodiment, and therefore will not be described, and only the dictionary registration processing will be described. FIG. 17 illustrates a flowchart representing the dictionary registration processing in the second exemplary embodiment.

In step S1040, a CPU 11 determines whether a termination instruction from a user is input. If the termination instruction is input (YES in step S1040), this dictionary registration processing ends. If the termination instruction is not input (NO in step S1040), the processing proceeds to step S1041. In step S1041, the CPU 11 acquires an image for registration. Subsequently, the CPU 11 sets a local area in step S1042, and then extracts a feature amount in step S1043. Further, in step S1044, the CPU 11 registers the feature amount. These steps S1041 to S1044 are similar to steps S1034 to S1037, respectively, in FIG. 14 in the first exemplary embodiment, and therefore will not be described in detail. Next, in step S1045, the CPU 11 updates a similarity degree calculation parameter through use of a registration dictionary acquired from a dictionary registration unit 105, using a similarity degree calculation parameter computing unit 106.

Assume that a similarity degree calculation parameter computed in the similarity degree calculation parameter computing processing before parameter update, i.e., a mean vector of feature amounts collected by a camera at an installation location, is $\sigma_0$, and a mean vector of all the feature amounts of the registration dictionary is $\sigma_r$. In this case, a similarity degree calculation parameter $\sigma$ after the update is expressed as follows.

$$\sigma = w_0 \sigma_0 + w_r \sigma_r \quad (7)$$

In this equation, $w_0$ and $w_r$ are weight coefficients for the respective similarity degree calculation parameters. In general, as compared with the number of feature amounts that can be collected by an installed camera, the number of feature amounts of a registration dictionary is small. Therefore, if an average is determined from the feature amounts of both sides, the influence of the feature amounts collected by the installed camera is large.

Therefore, as in the second exemplary embodiment, the respective calculated mean vectors are added by using predetermined weights, so that the extent of the influence of the mean vector determined based on the registration dictionary can be adjusted. The mean vector $\sigma_0$ may be computed beforehand. Alternatively, all the feature amounts collected by the camera at the installation location may be stored in a secondary storage device 14, and the mean vector $\sigma_0$ may be computed when the equation (7) is computed.

Next, in step S1046, the CPU 11 stores the similarity degree calculation parameter $\sigma$ computed based on the equation (7) into the secondary storage device 14, using a similarity degree calculation parameter storage unit 107. In the second exemplary embodiment, each time a new feature amount is registered into the registration dictionary, the similarity degree calculation parameter is computed, but the similarity degree calculation parameter is not necessarily computed each time. For example, the similarity degree calculation parameter may be computed when a predetermined number of new feature amounts are registered in the registration dictionary.

In addition, in the second exemplary embodiment, the mean vector $\sigma_r$ of all the feature amounts of the registration dictionary is computed with regard to equation (7), but may be computed by using another method. For example, first, a mean vector may be computed for each of human figures in the registration dictionary, and then the average of the mean vectors of the respective human figures may be calculated. This can inhibit the influence of a human figure having a large number of registered images from becoming excessively large, in a case where there is a large difference in the number of registered images between human figures.

As described above, in the second exemplary embodiment, not only the feature amounts collected from the captured image obtained by the installed camera as in the first exemplary embodiment, but also the feature amounts of the registration dictionary are reflected on the computation of the similarity degree calculation parameter. By using this technique, the similarity degree calculation parameter more suitable for the imaging conditions of the registered image can be computed.

As described above, according to each of the exemplary embodiments, in a case where the user performs the image registration, the user understands what kind of image is desirable for registration, so that the convenience in image registration improves. Further, the origin point suitable for authentication is used for each installation location of the camera and the plurality of local areas are set so that the origin point of the feature amount vectors is located inside the cluster of the feature amount vectors. Therefore, false authentication can be reduced.

The disclosure is not limited to each of the exemplary embodiments described above. For example, in each of the exemplary embodiments, the description is provided by using the case of the human face recognition as an example, but the disclosure is applicable to another object such as a pupil or a fingerprint of a human. In this case, while the local area is set based on the position of an organ such as the eye or nose of a face in the exemplary embodiments described above, a local area is set based on a characteristic area such as an iris and a feature amount is extracted.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-075350, filed Apr. 10, 2018, which is hereby incorporated by reference herein in its entirety.

What is claimed is:

1. An image authentication apparatus comprising:
   an image acquisition unit configured to acquire an image of an object to be authenticated from an image capturing apparatus;
   a registration unit configured to register the image of the object in a registration dictionary as a registered image;
   a setting unit configured to set a group to which the registered image is to be assigned;
   an output unit configured to output a registration status of an object to be registered for each group based on the group of the registered image set by the setting unit;
   a determination unit configured to determine, in a case where there is a group in which a number of the registered images set by the setting unit is larger than a predetermined number, a parameter for calculating a degree of similarity between an input image and the registered image registered in the registration dictionary; and
   a calculation unit configured to calculate the degree of similarity between the input image and the registered image registered in the registration dictionary using the determined parameter.

2. The image authentication apparatus according to claim 1, wherein the parameter is determined for each group set by the determination unit.

3. The image authentication apparatus according to claim 1, wherein the output unit outputs a display screen including the registration status, for each group set by the group setting unit.

4. The image authentication apparatus according to claim 3, wherein the output unit outputs the display screen to include a group to which no image is assigned, or a group in which a number of assigned images is less than that in another group.

5. The image authentication apparatus according to claim 1, wherein the registration status includes information indicating presence or absence of the registered image for each group set by the setting unit.

6. The image authentication apparatus according to claim 1, wherein the setting unit dynamically sets the group based on the image acquired by the image acquisition unit.

7. The image authentication apparatus according to claim 1, wherein the setting unit sets the group based on a variable factor of the image acquired by the image acquisition unit.

8. The image authentication apparatus according to claim 7, wherein the variable factor of the image is an illumination condition of the image acquired by the image acquisition unit.

9. The image authentication apparatus according to claim 7, wherein the variable factor of the image is a time at which the image is acquired by the image acquisition unit.

10. The image authentication apparatus according to claim 7, wherein the variable factor of the image is weather in which the image is acquired by the image acquisition unit.

11. The image authentication apparatus according to claim 1, wherein upon receipt of a registration request for registering an image of the object in the registration dictionary, the output unit acquires information about the set group from the setting unit, generates a display screen including the information about the group, and outputs the generated display screen to the display apparatus.

12. The image authentication apparatus according to claim 1, wherein the registration status includes information indicating presence or absence of an image registered in the registration dictionary, for each human figure to be authenticated.

13. The image authentication apparatus according to claim 1, wherein the output unit outputs a display screen to include information representing a number of images acquired by the image acquisition unit.

14. The image authentication apparatus according to claim 1, further comprising an area setting unit configured to set a plurality of local areas with respect to the image acquired by the image acquisition unit,
wherein the determination unit determines the parameter for each of the plurality of local areas set by the area setting unit, and
wherein the calculation unit calculates the degree of similarity for each of the plurality of local areas set by the area setting unit.

15. The image authentication apparatus according to claim 1, further comprising an extraction unit configured to extract a feature amount from an image acquired by the image acquisition unit,
wherein the determination unit determines an origin point for defining an angle between vectors in a feature space, as the parameter, and
wherein the calculation unit calculates the degree of similarity based on an angle between vectors, using the computed origin point.

16. The image authentication apparatus according to claim 15, wherein the origin point is computed from an average of a plurality of feature amounts extracted by the extraction unit.

17. The image authentication apparatus according to claim 1,
wherein the parameter is a Mahalanobis matrix, and
wherein the calculation unit calculates the degree of similarity based on the Mahalanobis matrix.

18. An image authentication method comprising:
acquiring an image of an object to be authenticated from an image capturing apparatus;
registering the image of an object in a registration dictionary as a registered image;
setting a group to which the registered image is to be assigned;
outputting a registration status of an object to be registered for each group based on the group of the registered image;
determining, in a case where there is a group in which a number of the registered images is larger than a predetermined number, a parameter for calculating a degree of similarity between an input image and the registered image registered in the registration dictionary; and
calculating the degree of similarity between the input image and the registered image registered in the registration dictionary using the determined parameter.

19. A non-transitory computer-readable storage medium that stores a computer program for causing a computer connected to an image capturing apparatus to operate as:
an image acquisition unit configured to acquire an image of an object to be authenticated from the image capturing apparatus;
a registration unit configured to register the image of an object in a registration dictionary as a registered image;
a setting unit configured to set a group to which the registered image is to be assigned;
an output unit configured to output a registration status of an object to be registered for each group based on the group of the registered image set by the setting unit;
a determination unit configured to determine, in a case where there is a group in which a number of the registered images set by the setting unit is larger than a predetermined number, a parameter for calculating a degree of similarity between an input image and the registered image registered in the registration dictionary; and
a calculation unit configured to calculate the degree of similarity between the input image and the registered image registered in the registration dictionary using the determined parameter.

* * * * *